United States Patent
Goldstein

(10) Patent No.: US 10,045,134 B2
(45) Date of Patent: Aug. 7, 2018

(54) EARGUARD MONITORING SYSTEM

(71) Applicant: Staton Techiya, LLC, Delray Beach, FL (US)

(72) Inventor: Steven Wayne Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

(21) Appl. No.: 14/574,567

(22) Filed: Dec. 18, 2014

(65) Prior Publication Data
US 2015/0172841 A1 Jun. 18, 2015

Related U.S. Application Data

(63) Continuation of application No. 11/763,281, filed on Jun. 14, 2007, now Pat. No. 8,917,876, which is a
(Continued)

(51) Int. Cl.
*H04R 29/00* (2006.01)
*G01H 3/14* (2006.01)
*H04R 3/00* (2006.01)

(52) U.S. Cl.
CPC .............. *H04R 29/00* (2013.01); *G01H 3/14* (2013.01); *H04R 3/007* (2013.01); *H04R 29/008* (2013.01); *H04R 2460/15* (2013.01)

(58) Field of Classification Search
CPC .. H04R 29/008; H04R 3/007; H04R 2460/15; H04R 29/00; G01H 3/14; H04S 7/40
(Continued)

(56) References Cited

U.S. PATENT DOCUMENTS 3,802,535 A 4/1974 Peake
3,987,245 A 10/1976 Fasen
(Continued)

FOREIGN PATENT DOCUMENTS

EP 165468 12/1985
EP 1615468 A1 1/2006
(Continued)

OTHER PUBLICATIONS

Office Action for U.S. Appl. No. 11/931,252, dated Jul. 19, 2011.
(Continued)

*Primary Examiner* — Vivian Chin
*Assistant Examiner* — Con P Tran
(74) *Attorney, Agent, or Firm* — Akerman LLP; Peter A. Chiabotti; Mammen (Roy) P. Zachariah, Jr.

(57) ABSTRACT

A sound pressure level (SPL) monitoring information system includes a database configured to store data including at least one of a list of earpiece devices and associated instrument response functions, an audiogram compensation information, or an earpiece frequency response function. The system further includes an SPL monitoring system comprising a microphone. The SPL monitoring system can be configured to receive a plurality of signals, each signal representing a respective SPL of sound pressure values over a time duration for a particular frequency band, the SPL monitoring system configured to determine at least one of: (a) an exposure time duration when at least one of the signals exceeds a SPL threshold value for the particular frequency band or (b) a recovery time duration when at least one of the signals is less than the SPL threshold value for the particular frequency band. Other embodiments are disclosed.

20 Claims, 10 Drawing Sheets

Related U.S. Application Data continuation-in-part of application No. 11/757,152, filed on Jun. 1, 2007, now Pat. No. 8,311,228.

(60) Provisional application No. 60/804,650, filed on Jun. 14, 2006.

(58) Field of Classification Search
USPC ......... 381/56, 58, 380, 122, 59, 60, 61, 312, 381/314, 316; 73/646, 645; 704/258; 977/952; 354/82, 83; 362/23.07, 23.08; 345/82, 83
See application file for complete search history.

(56) References Cited

U.S. PATENT DOCUMENTS

| | | |
|---|---|---|
| 4,554,639 A | 11/1985 | Baker |
| 4,947,432 A | 8/1990 | Topholm |
| 5,430,826 A | 7/1995 | Webster |
| 5,692,059 A | 11/1997 | Kruger |
| 5,757,930 A | 5/1998 | Seidemann |
| 5,825,894 A | 10/1998 | Shennib |
| 6,379,314 B1 | 4/2002 | Horn |
| 6,415,034 B1 | 7/2002 | Hietanen |
| 6,456,199 B1 | 9/2002 | Michael |
| 6,473,512 B1 | 10/2002 | Juneau |
| 6,567,524 B1 | 5/2003 | Svean et al. |
| 6,648,820 B1 | 11/2003 | Sarel |
| 6,661,901 B1 | 12/2003 | Svean et al. |
| 6,754,359 B1 | 6/2004 | Svean |
| 6,826,515 B2 | 11/2004 | Bernardi et al. |
| 6,840,908 B2 | 1/2005 | Edwards |
| 7,756,281 B2 | 7/2010 | Goldstein |
| 7,983,426 B2 | 7/2011 | Schuler et al. |
| 8,340,310 B2 | 12/2012 | Ambrose et al. |
| 8,391,534 B2 | 3/2013 | Ambrose et al. |
| 8,526,651 B2 | 9/2013 | Lafort et al. |
| 8,526,652 B2 | 9/2013 | Ambrose et al. |
| 8,550,206 B2 | 10/2013 | Keady et al. |
| 8,774,435 B2 | 7/2014 | Ambrose et al. |
| 2003/0002688 A1 | 1/2003 | Kanevsky et al. |
| 2003/0165246 A1 | 9/2003 | Kvaloy |
| 2003/0191609 A1 | 10/2003 | Bernardi et al. |
| 2004/0190729 A1 | 9/2004 | Yonovitz et al. |
| 2004/0202333 A1 | 10/2004 | Csermak et al. |
| 2004/0208333 A1 | 10/2004 | Cheung et al. |
| 2005/0020873 A1 | 1/2005 | Berrang et al. |
| 2005/0100169 A1 | 5/2005 | Shelley et al. |
| 2005/0117765 A1 | 6/2005 | Meyer et al. |
| 2005/0123146 A1 | 6/2005 | Voix et al. |
| 2005/0232452 A1 | 10/2005 | Armstrong et al. |
| 2005/0250439 A1 | 11/2005 | Leslie |
| 2005/0254665 A1 | 11/2005 | Vaudrey |
| 2005/0254667 A1 | 11/2005 | Michael |
| 2005/0271217 A1 | 12/2005 | Saunders et al. |
| 2006/0137934 A1 | 6/2006 | Kurth |
| 2006/0140425 A1 | 6/2006 | Berg et al. |
| 2006/0262938 A1 | 11/2006 | Gauger et al. |
| 2007/0129828 A1 | 6/2007 | Lee et al. |
| 2007/0147624 A1 | 6/2007 | Fischer |
| 2007/0214893 A1 | 9/2007 | Killion |
| 2007/0270988 A1 | 11/2007 | Goldstein |
| 2007/0274531 A1 | 11/2007 | Camp |
| 2007/0291953 A1 | 12/2007 | Ngia et al. |
| 2008/0194984 A1 | 8/2008 | Keefe |
| 2011/0160811 A1 | 6/2011 | Walker |

FOREIGN PATENT DOCUMENTS

| | | |
|---|---|---|
| GB | 2098733 | 11/1982 |
| WO | WO2006/002055 A2 | 1/2006 |

OTHER PUBLICATIONS

Part 380 Occupational Noise Exposure, Michigan Occupational Safety and Health Administration, 2004.

Extended European Search Report for European Application No. 07798583.6, dated Jan. 4, 2013.

International Search Report for International Application No. PCT/US07/71253, dated Feb. 1, 2008.

Osha, "Occupational Noise Exposure", Jul. 1, 2005, Section 1910.95, pp. 211-223.

Shotland, Dosimetry Measurements Using a Probe Tube Microphone In the Ear Canal, J. Acoust. Soc. Am., vol. 99, No. 2, pp. 979-984, Bethesda, Maryland 20892.

EARGUARD MONITORING SYSTEM

CROSS-REFERENCE TO RELATED APPLICATIONS

This application is a Continuation of U.S. patent application Ser. No. 11/763,281, filed 14 Jun. 2007, which is a Continuation in Part of patent application Ser. No. 11/757,152, filed 1 Jun. 2007 the disclosures of which are incorporated herein by reference in their entirety, and additionally claims the priority benefit of Provisional Application No. 60/804,650 filed on Jun. 14, 2006 the disclosure of which is incorporated herein by reference in it's entirety as well.

FIELD

The present invention relates to a system for monitoring the sound pressure levels at a listener's ear, and in particular, though not exclusively, to monitoring the sound pressure levels over time and to utilize that information to reduce hearing damage.

BACKGROUND

With the advent of an industrial society, people are exposed to noise pollution at greater and greater levels; both from background, such as street traffic, airplanes, construction sites and intentional exposure to high sound levels such as cell phones, MP3 players, and rock concerts. Studies show that ear damage, leading to permanent hearing impairment is not only increasing in the general population, but increasing at a significantly faster rate in younger populations.

The potential for hearing damage is a function of both the loudness and the duration of exposure to the sound stimulus. Safe listening durations at various loudness levels are known, and can be calculated by averaging audio output levels over time to yield a time-weighted average. Standard guidelines published by OSHA, NIOSH or other agencies are known. This calculation can be even further improved by or counting for aspects of the playback scenario, specifically the characteristics of the sound source and their proximity to the listener's ear.

Studies have also indicated that hearing damage is a cumulative phenomenon. Although hearing damage due to industrial or background noise exposure is more thoroughly understood, the risk of exposing one's self to excessive noise, especially with the use of headphones has also been recently studied. Protecting the ear from ambient noise is primarily done with the use of static earplugs that attempt to shield the inner ear from excessively high decibel noise. Background noise canceling earphones such as those produced by Bose—and others, attempt to protect the ear from excessive ambient noise by producing a counter noise wave to cancel out the ambient noise at the ear. These prior art devices have been less than satisfactory because they do not completely prevent high decibel noise from reaching the ear, and do not account for the duration of exposure to harmful sounds at the ear.

Active noise reduction at the ear to protect the ear from exposure to loud noises is discussed in U.S. published Application No. US2005/0254665. The art actively attenuates noise reaching the inner ear utilizing a control; a connection with an earpiece and attenuating the noise to the ear. However, there is no monitoring of the noise over time to account for the cumulative effect. Furthermore, there is no accounting for any restorative effects for sound pressure levels, which are healing to the ear rather than destructive.

Dosimeters, such as that described in U.S. published Application No. US2005/0254667 are known. The device periodically measures prior sound level within the ear canal. However, the device does not take into account the cumulative effect of the noise or the effect of any restorative period. Furthermore, no remedial action is taken as a result of the readings.

It is also known from the related art that headphones for consumer electronics have been provided with a predetermined maximum output level in an attempt to prevent ear damage. This approach is ineffective as it does not take into account listening duration and the calculation of risk for auditory injury. Other headphones are maximum-limited to produce levels that can still result in significant overexposure given enough time, or limit the user to levels, which may not be sufficient to achieve a short term listening level. In the latter case, consumer acceptance for the protective gear could be severely limited and a product would fail to survive in a competitive market and therefore be of no use.

Another alternative known in the art is to reduce the headphone output levels by increasing earphone impedance via an accessory placed between the media player and the earphones. The limitation of this approach is that it gives no consideration to the duration of exposure, and again either the user's chosen listening level cannot be achieved because the maximum level is too limited, or the level is sufficient to allow the user access to high enough sound levels, but risk overexposure due to potential duration of use.

Additionally, related art systems fail to show, suggest, or teach a method for sharing an audio transmission amongst enabled devices over a wireless communications system. Nor do the related art systems disclose a detailed registration process, through which the ear input SPL monitoring system can be customized for an individual user.

SUMMARY

At least one exemplary embodiment is directed to a SPL monitoring system comprising: an audio transducer, where the audio transducer is configured to receive sound pressure, and where the audio transducer outputs a plurality of electronic signals, where each signal represents sound pressure levels (SPLs) for a particular frequency band; a logic circuit, where time is broken into increments of time, where the logic circuit measures and stores in a memory storage system an exposure time duration when a signal's SPL exceeds a threshold value for the particular frequency band of the signal and stores the SPL level associated with each increment of time in the exposure time duration, and where the logic circuit measures and stores a recovery time duration when the signal's SPL drops below the threshold value for the particular frequency band of the signal and stores the SPL level associated with each increment of time in the recovery time duration, where the logic circuit calculates over an averaging time interval an average SPL dose within the averaging time interval, and where the logic circuit calculates a safe time duration over which a user can receive current sound pressure values; and an indicator element, where the indicator element produces a notification when an indicator level occurs, where the indicator level is at least one of: when the safe time duration has been exceeded; when a listening duration is within a certain percentage range of the safe time duration; when a listening duration is within various levels, where each level is represented by an indicator color and where each level represents a percentage range of the safe time duration; when the power is low; and when at least one feature is not working.

At least one exemplary embodiment is directed to an SPL monitoring information system comprising: a database stored on a memory storage system, where the database includes data, where the data is at least one of: a list of earpiece devices and associated instrument response functions; a user's audiogram compensation information; and an earpiece frequency response function; a retriever interface, where a request is obtained through the retriever interface by a sending unit; a logic circuit; and an output control unit, where the request includes a request for a subset of data, where the logic circuit compares the request with the data in the database and retrieves the subset of data and sends it to the output control unit, where the output control unit sends the subset of data to the sending unit.

Further areas of applicability of exemplary embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS

Figure 1:
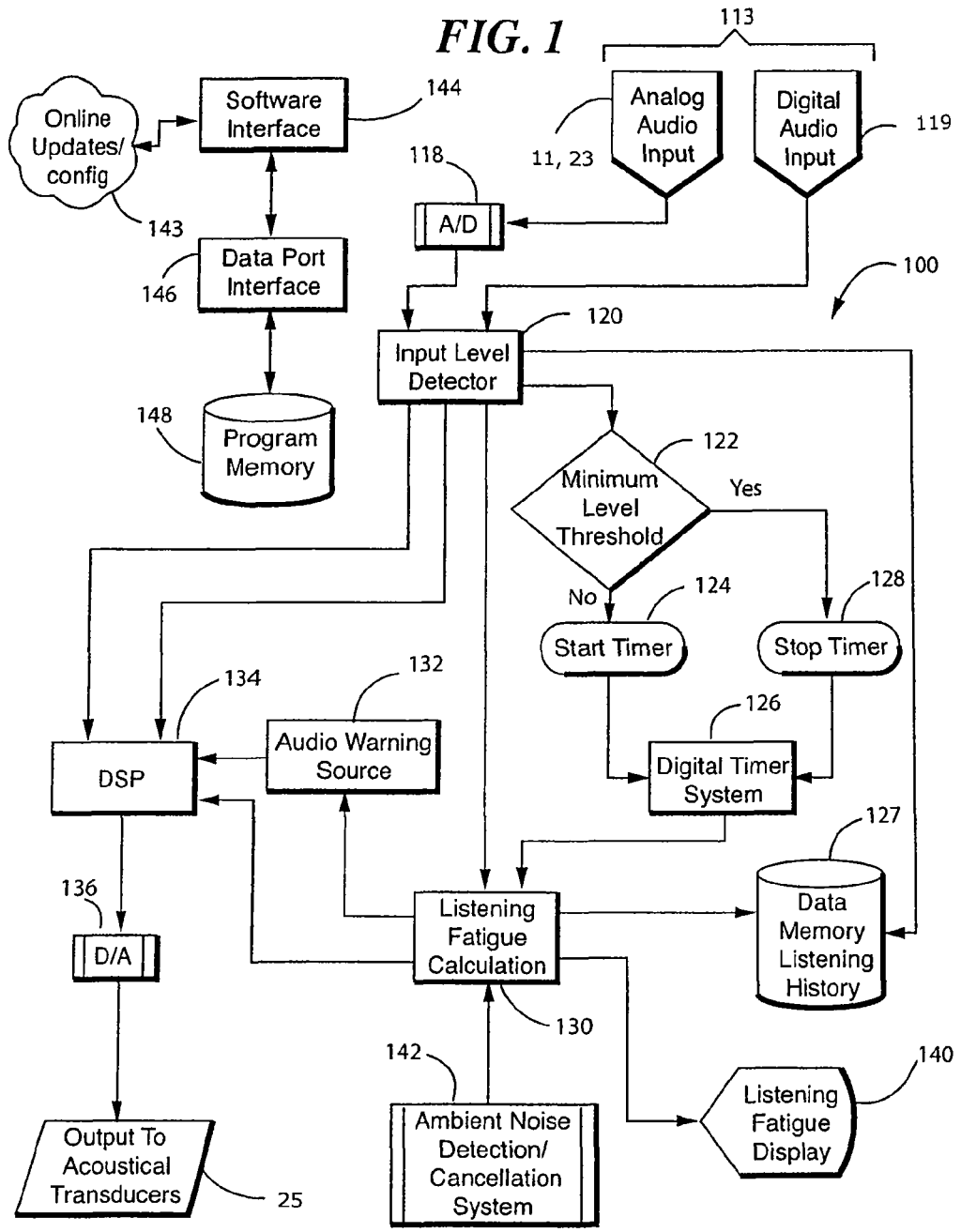
FIG. 1 is a block diagram of the system for measuring and determining exposure to sound over time at the ear constructed in accordance with a first exemplary embodiment of the invention.

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example closed cavity volume.

In all of the examples illustrated and discussed herein any specific values, for example the number of users, a particular type of wireless communication protocol, should be interpreted to be illustrative only and non limiting. Thus, other examples of the exemplary embodiments could have different values or use other protocols.

Notice that similar reference numerals and letters refer to similar items in the following figures, and thus once an item is defined in one figure, it may not be discussed for following figures.

Sample Terminology

The following terminology presents examples only of meanings of commonly used terminology and is intended to aid in the understanding of exemplary embodiments, and is not meant to be limitative in nature.

Audiogram: An "Audiogram" can be a measured set of data describing a specific individual's ability to perceive different sound frequencies.

Attenuation: "Attenuation" can be defined as a reduction of the signal output level either by linear gain reduction, by dynamic range reduction, or a combination of both.

Client: A "Client" can be defined as a system that communicates with a Server and directly interfaces with a user.

Control Data: "Control Data" can be defined as information that dictates the operating parameters for a system or a set of systems. For the ear input SPL monitoring system described in at least one exemplary embodiment, Control Data includes minimum input threshold parameters, acoustical transducer characteristics, the dBv to dBspl transfer function, the time-weighted average noise exposure calculation parameters, the function relating time-weighted average noise exposure to recommended listening durations, and any filtering parameters that relate to Audiogram compensation, inverse Headphone response, personal preferences, audiological recommendations or other related data.

Headphones: "Headphones" can be a set of acoustical transducers intended as personal listening devices that are placed either over the pinnae, very near the ear canal, or inside the ear canal of the listener. This includes the Playback Hardware commonly referred to as "earbuds," or "headphones," as well as other earpiece devices.

Hearing Damage: "Hearing Damage" can be defined as any temporary threshold shift (TTS) or permanent threshold shift (PTS) in an individual's hearing due to exposure to auditory stimuli.

Listening Habits History: "Listening Habits History" can be defined as a record of a user's listening habits over time. This record can include ear input SPL data, listening duration data, time between listening sessions, and other related data.

Playback Hardware: For example devices that can be used to play previously recorded or live streaming audio. Including, for example, Headphones, loudspeakers, personal music players, and other listening devices.

Server: A "Server" can be defined as a system that controls centrally held data and communicates with Clients.

An SPL Monitoring System

Figure 2:
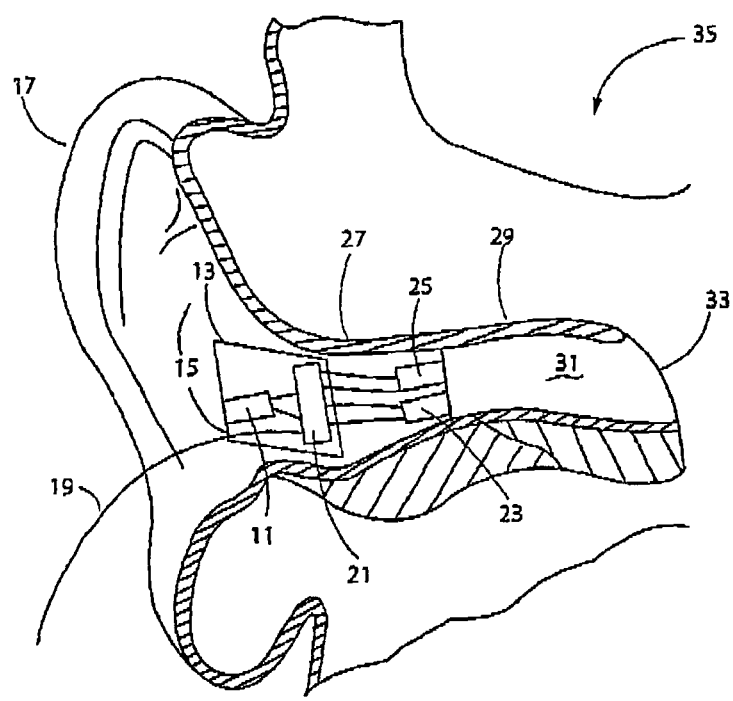
FIG. 2 is a block diagram of the system in accordance with at least one exemplary embodiment of the invention in situ in the ear.

At least one exemplary embodiment of the invention is directed to measuring and determining the exposure to sound at the ear over time. Reference is made to FIG. 1 in which a system, generally indicated as 100, is constructed in accordance with at least one exemplary embodiment of the invention. System 100 includes an audio input device 113 for receiving sound at the ear. As will be discussed below, audio input 113 can include an analog audio input 11, 23 and a digital audio input 119. In at least one exemplary embodiment, audio input 113 receives audio input from at least one of three sources, namely; ambient noise around the ear, direct input noise such as a MP3 player or other device which can produce a digital audio input at digital audio input 119, and noise as detected within the ear canal 31 (FIG. 2). The audio input 113 outputs an audio signal corresponding to the received sound. Analog output signals from analog audio inputs 11, 23 are converted to a digital signal by an analog-to-digital (A/D) converter 118 so that digital sound signals are input into a level detector 120.

Input level detector 120 determines the sound pressure level of the sound received at audio input 113. Input level detector 120 outputs a sound pressure level (SPL) signal, which is input to a minimum-level threshold detector 122. Minimum level threshold 122 determines whether or not the sound pressure level as detected by input level detector 120 exceeds a minimum level threshold. As will be discussed below, the minimum level threshold can be the effective quiet level of the individual, or some predetermined level substantially corresponding to a level, which is ear damage neutral over time or a level of interest, such as 80 dB, because of its effect on the ear. Therefore, if the minimum level threshold is detected as being exceeded, a loud signal is output to a start timer 124, which triggers a digital timer 126 to begin a clock. Conversely, if the minimum level threshold is detected as being below the minimum threshold, a quiet signal is output to a start timer 124, which triggers a digital timer 126 to begin a clock of a restorative period. If the sound pressure level is at the minimum threshold, no clock needs to be started because this is neutral to the desired effect. In a preferred embodiment, the clock signal is changed with every significant (more than 1 dB by way of example) change in sound pressure level to get an accurate profile of sound exposure over time.

Once the sound pressure level as detected at input detector level 120 is at the minimum level, a stop timer signal 128 is output to digital timer 126 to stop the clock corresponding to exposure to the loud level. Digital timer 126 outputs a clock value corresponding to the time period at which the minimum level threshold was not met, or in the proffered embodiment, for each period corresponding to a discrete level change.

A data memory or learning history databank 127 receives the clock value from digital timer 126 as well as the actual input level detected at input level detector 120 and determines a listening history or sound pressure level exposure history. The sound pressure level exposure history is a record of the user's exposure to sound pressure levels over time. Because the effect of exposure is cumulative, it is important that the exposure history be maintained. The listening history, as will be discussed below, can include real ear level data, listening duration data, time between listening sessions, absolute time, sound pressure level dose data, including any restorative sound level, number of acoustic transients and crest factor and other data.

The sound pressure level exposure history or listening history includes both the listening habits history and the environmental or ambient noise exposure history. The environmental noise exposure history is the exposure of a user to environmental noise over time as a result of the auditory stimuli inherent to the environment where the user is present. This can be highway traffic, construction site, even the restorative effect of the quiet of a library whereas, the listening habits history is associated for the purposes for this disclosure with user-directed auditory stimuli such as music, words, other noises, which a user intentionally encounters for a purpose such as communication, learning, and enjoyment. Therefore, database 127, as will be discussed below, stores the cumulative SPL exposure.

It should be noted that in at least one exemplary embodiment, minimum level threshold detector 122 also starts the timer when the sound pressure level is below the predetermined level. In this way, the restorative effect of below effective quiet noise is accumulated for determining overall exposure damage potential.

In effect, the only time that digital timer 126 is not running is when the detected sound pressure level signal is at the minimum threshold level. A listening fatigue calculator 130 receives the input level signal from input level detector 120 and data from the data memory listening history 127, and determines whether or not listening fatigue or hearing damage is likely to occur as a result of further exposure. Hearing damage is the injury to the hearing mechanism including conductive and sensorineural decrement in hearing threshold levels. It can be either temporary or permanent so long as it is a result of the noise exposure above Effective Quiet. In other words, listening fatigue calculator 130 will output a signal when a threshold determined as a function of exposure time and sound pressure level, as will be discussed in greater detail below, is achieved. At that point, a listening fatigue signal is output.

It should be noted that in an alternative embodiment, system 100 can make use of an ambient noise detection/ cancellation system 142 as known in the art. These systems produce signals, which negate noise pressure levels at certain frequencies and/or certain levels to reduce the effect of undesired noise, whether environmental noise or user directed noise. It will have some effect in elongating the exposure time by negating the sound pressure level detected by input level detector 142.

In at least one exemplary embodiment, the listening fatigue signal is utilized to prevent damage and encourages some action by the user when exposure levels are near damaging levels. Therefore, in one non-limiting example, a listening fatigue display 140 is provided for receiving the listening fatigue signal and displaying to the user a prompt to discontinue exposure to the sound level from the damaging sound source or audio source.

In another non-limiting example, the listening fatigue signal is output to an audio warning source 132, which outputs an output audio warning to the user notifying the user that exposure to the sound source has reached critical levels.

In at least one exemplary, but non-limiting, embodiment, as will be discussed below, system 100 includes an output acoustical transducer 25 to provide an audio signal to the ear. Output acoustical transducer 25 operates under the control of a digital signal processor 134. Digital signal processor 134 receives a digital audio signal from input level detector 120, which acts as a pass through for the digitized signals from audio input 113. Digital signal processor 134 passes the sound signals through to a digital to analog converter 136 to drive acoustical transducers 25 to recreate the sound received at audio input 113 inside the ear canal in at least one exemplary embodiment of the invention as shown in FIG. 2. With such an exemplary embodiment, audio warning source 132 provides an output to digital sound processor 134 causing output acoustical transducer 25 to output a warning sound inside the ear of the user.

Lastly, in at least one further exemplary embodiment, listening fatigue calculator 130 outputs a listening fatigue signal to digital processor 134 which causes digital signal processor 134 to attenuate the sound signal prior to output to acoustical transducer 25 to reduce the signal output level by any of the linear gain reduction, dynamic range reduction, a combination of both, or a complete shutdown of transducer 25. Attenuation would be at least to the level, if not below, the effective quiet level to allow for ear recovery prior to damage.

It should be noted, that because personal hearing levels can change from person to person, and because both of the time intervals are a function of many variables, in a non-limiting example, to provide a dynamic ever-changing response, system 100 operates under software control. The configuration of the digital sound processor 134, listening fatigue calculator 130, the minimum level threshold detector 122, and the input level detector 120 are operated under software control.

In an exemplary embodiment of the invention, the control programs are stored in a program memory 148 for operating the firmware/hardware identified above. Furthermore, the program stored within memory 148 can be personalized as a result of testing of the user's ear, or by other modeling methods, in which system 100 includes a software interface 144 for receiving online or remote source updates and configurations. The software interface 144 communicates with a data port interface 146 within system 100, which allows the input of software updates to program memory 148. The updates can be transmitted across a distributed communications network, such as the Internet, where the updates take the form of on line updates and configurations 143.

It should be noted that there is multiple functionality distributed across system 100. In at least one exemplary embodiment, at least audio input 113 and acoustical transistor 25 are formed as an earpiece, which extends into the outer ear canal so that the processing of signals pertains to sound received at the ear. However, it is well within the scope of at least one exemplary embodiment of the invention to provide substantially all of the functionality in an earpiece so that system 100 is a "smart device."

Reference is now made to FIG. 2 in which system 100 in which the transducer configuration, that portion of system 100, which converts sound pressure level variations into electronic voltages or vice versa is shown. In this embodiment, acoustic transducers include microphones as an input and loudspeakers as an acoustical output.

FIG. 2 depicts the electro acoustical assembly 13 as an in-the-ear acoustic assembly or earpiece, as it would typically be placed in the ear canal 31 of ear 17 of user 35. The assembly is designed to be inserted into the user's ear canal 31, and to form an acoustic seal with the walls 29 of the ear canal at a location 27, between the entrance to the ear canal 15 and the tympanic membrane or eardrum 33. Such a seal is typically achieved by means of a soft and compliant housing of assembly 13. A seal is useful to the performance of the system in that it creates a closed cavity in ear canal 31 (e.g. of approximately 0.5 cc) in a non-limiting example between the in-ear assembly 13 and the ear's tympanic membrane 33.

As a result of this seal, the output transducer (speaker) 25 is able to generate a full range bass response time when reproducing sounds for the system user. A seal can also serve to significantly reduce the sound pressure level at the user's eardrum 33 resulting from the sound field at the entrance to the ear canal 15. A seal is also the basis for the sound isolating performance of the electroacoustic assembly 13. Located adjacent to speaker 25, is an ear canal microphone 23, which is also acoustically coupled to closed cavity 31. One of its functions is that of measuring the sound pressure level in cavity 31 as a part of testing the hearing acuity of the user as well as confirming the integrity of the acoustic seal and the working condition of itself and speaker 25. Audio input 11 (ambient microphone) is housed in assembly 13 and monitors sound pressure at the entrance to the occluded ear canal. All transducers receive or transmit audio signals to an ASIC 21 that undertakes at least a portion of the audio signal processing described above and provides a transceiver for audio via the wired or wireless communication path 19.

In the above description the operation of system 100 is driven by sound pressure level, i.e. sound levels are monitored for time periods or epochs during which the sound pressure level does not equal the minimum threshold or is constant. However, as will be discussed in connection with the next exemplary embodiments of the invention, system 100 can also operate utilizing fixed or variable sampling epochs determined as a function of one or more of time and changes in sound pressure level, sound pressure dosage level, a weighted sound pressure level, and restorative properties of the ear.

Figure 3:
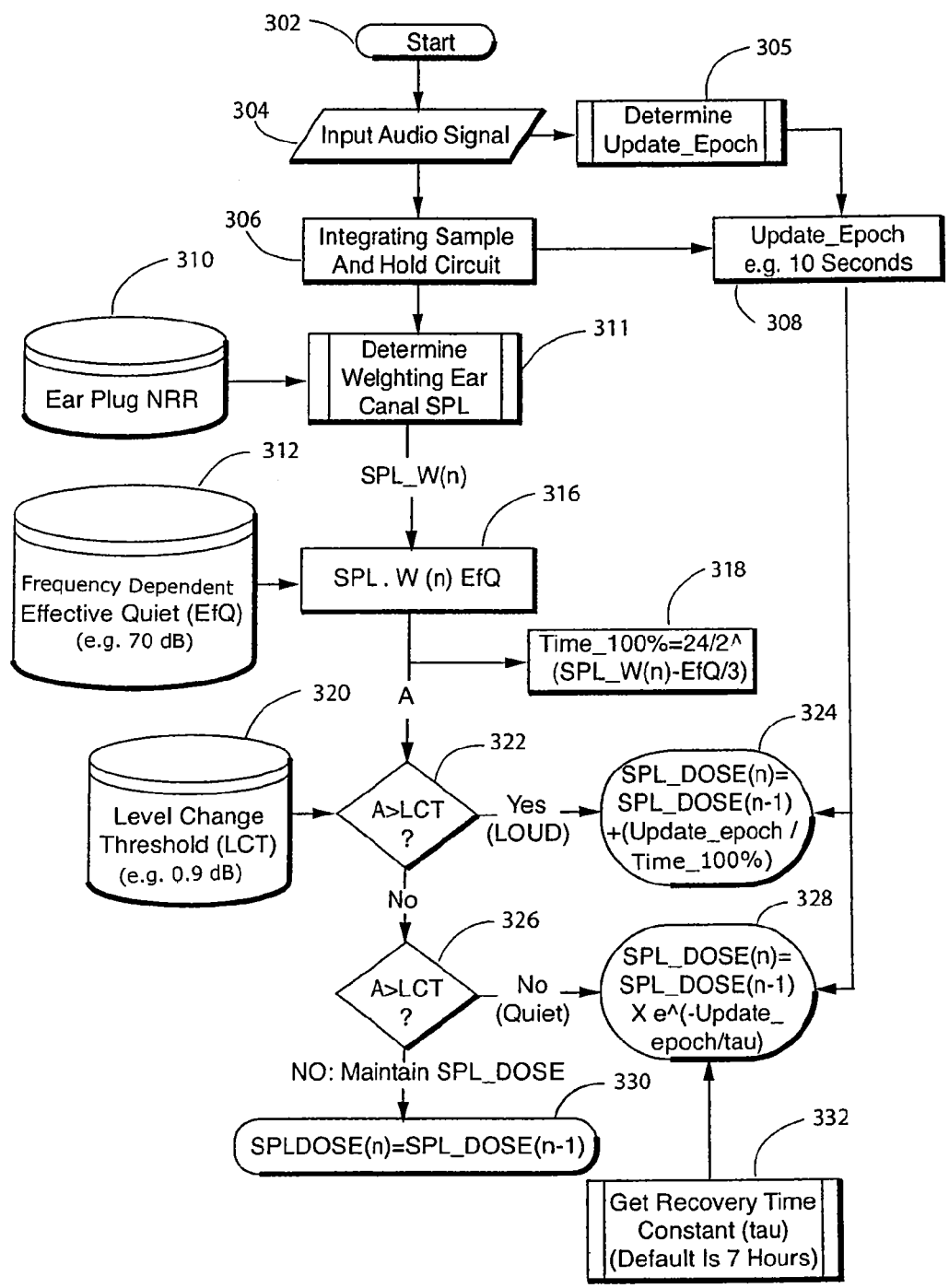
FIG. 3 is a flow chart for calculating listening fatigue in accordance with at least one embodiment of the invention by measuring a quantity (e.g., the sound pressure level) over time as perceived at the ear.

Reference is now made to FIG. 3 in which a flow chart for monitoring the sound pressure level dose at various sample times n is provided. The process is started in a step 302. An input audio signal is generated in a step 304 at either the ear canal microphone 23 or the ambient sound microphone 11. Exposure time is a function of the sound pressure level, therefore, the epoch or time period used to measure ear exposure or, more importantly, the time-period for sampling sound pressure level is determined in a step 305. The update epoch is used in the SPL dose function determination as well as to effect the integration period for the sound pressure level calculation that, as will be discussed below, is used to calculate the weighted ear canal sound pressure level.

Figure 6:
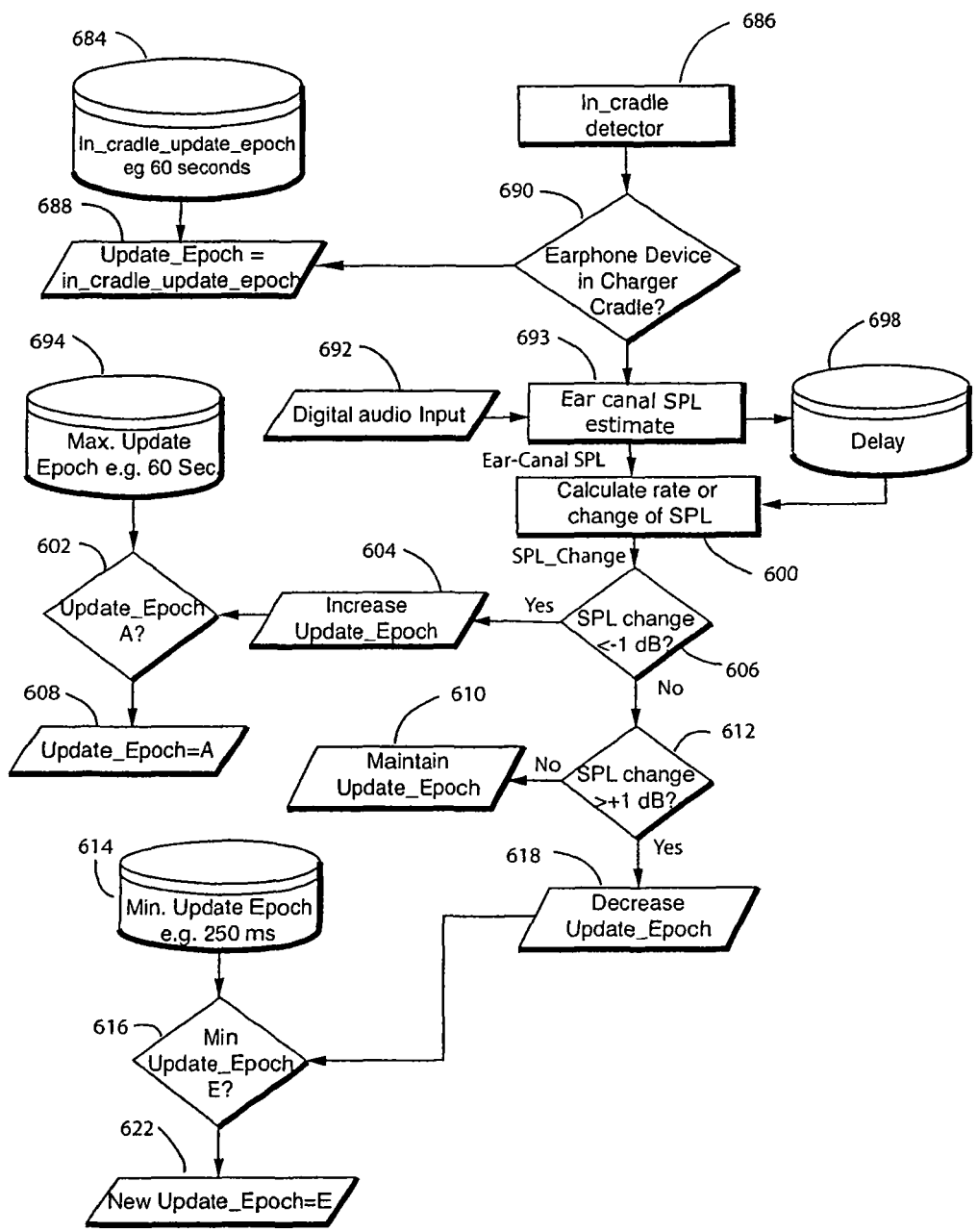
FIG. 6 is a flow chart for determining an update epoch in accordance with at least one exemplary embodiment of the invention.
Figure 7:
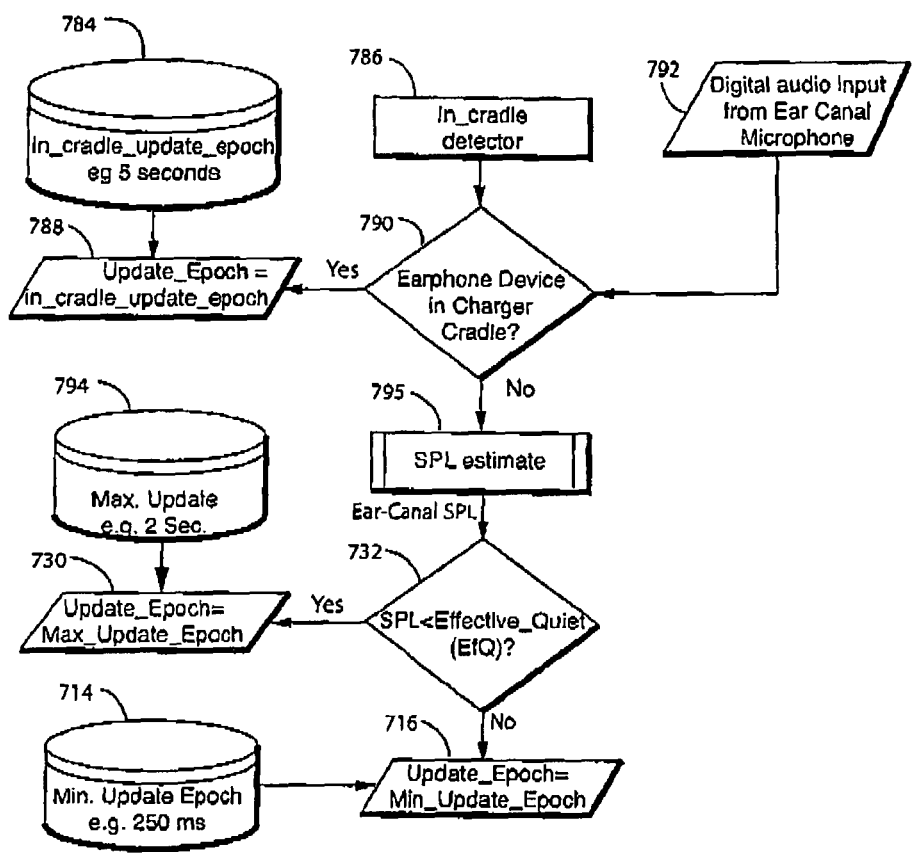
FIG. 7 is a flow chart for determining an update epoch in accordance with yet another exemplary embodiment of the invention.

Reference is now made to FIGS. 6 and 7. In FIG. 6, a method is defined to change the update epoch as a function of the weighted ear canal sound pressure level, which will be discussed in greater detail below. System 100 is capable of determining when earpiece 13 is in a charger or communication cradle (i.e., not in use in the ear of the user). In a step 684, a predetermined standard is provided for the update epoch, 60 seconds in this example. In step 688, the update epoch is set as the in-cradle update epoch. The in-cradle state is detected is a step 686. If it is determined in a step 690 earpiece 13 is in a charger or cradle mode, then the update epoch is set at the in-cradle epoch; in the step 688.

However, if in step 690 it is determined that the earphone device is in use, in other words "not in the cradle", then, by default, an audio signal is input to earpiece 13 in step 692. In step 693, an ear canal sound pressure level is estimated as a function of the audio input at step 692. The current (n) ear canal sound pressure level estimate is stored as a delay level in a step 698. An audio input is determined at a later time when step 692 is repeated so that a second in-time ear canal sound pressure level estimate is determined.

In a step 600, the delayed (n−1) or previous sound pressure level is compared with the current (n) ear canal sound pressure level estimate to calculate a rate of change of the sound pressure level. The change level is calculated in units of dB per second. This process of step 692 through 600 is periodically repeated.

In a step 606, it is determined whether or not the sound pressure level change is less than a predetermined amount (substantially 1 dB by way of non-limiting example) between iterations, i.e., since the last time the ear canal sound pressure level is calculated. If the change is less than the predetermined level, then in step 604 the update epoch is increased. It is then determined in a step 602 whether or not the epoch update is greater than a predefined amount D set in step 694 as a maximum update epoch such as 60 seconds in a non-limiting example. If in fact, the update epoch has a value greater than the maximum update epoch D then the update epoch is set at the higher value D (step 608).

If it is determined in step 606 that the sound pressure level change is greater than −1 dB, but less than +1 dB as determined in step 612, then the update epoch value is maintained in a step 610. However, if it is determined that the sound pressure level change is greater than +1 dB, then the update epoch value is decreased in a step 618 to obtain more frequent couplings. A minimum predetermined update epoch value such as 250 microseconds is set in a step 614. At step 616, if the decreased update epoch determined in step 618 is less than, in other words an even smaller minimum time-period than the predetermined minimum update epoch E, then the new update epoch is set as the new minimum update epoch value (step 622). In this way, the sample period is continuously being adjusted as a function of the change in sound pressure level at the ear. As a result, if the noise is of a spike variety as opposed to constant value, the sampling interval will be changed to detect such spikes and protect the ear.

Reference is now made to FIG. 7 in which a method for changing the update epoch is illustrated as a function of the way that the ear canal sound pressure level estimate is provided. Again, in accordance with at least one exemplary embodiment of the invention, the update epoch is decreased when the ear canal sound pressure level is high or increasing.

The difference between the embodiment of FIG. 7 and the embodiment of FIG. 6 is that the update epoch is not continuously adjusted, but is more static. If the ear canal sound pressure level is less than effective quiet (a decibel level) which when exposed to the ear over time does not damage or restore the ear), then the update epoch is fixed at a predefined maximum epoch value and this is the value used by system 100 as will be discussed in connection with FIG. 3 below. In this embodiment, if the ear canal sound pressure level is determined to be greater then effective quiet, then the update epoch is fixed at a shorter minimum value and this is returned as the update epoch to be utilized.

In FIG. 7, specifically, as with FIG. 6, an in-cradle update epoch of 5 seconds by way of non-limiting example, is stored in system 100 in a step 784. In a step 788, the initial update epoch is set as the in-cradle update epoch. A maximum update epoch time, such as 2 seconds by way of non-limiting example, is stored in a step 794. In a step 714, an initial minimum update epoch (250 microseconds in this non-limiting example) is stored.

In a step 786 and step 790 it is determined whether or not system 100 is in a non-use state, i.e., being charged or in a cradle. If so, then the update epoch is set at the in-cradle update epoch. If not, then a digital audio signal is input from ear canal microphone 25 in step 792. A sound pressure level is estimated in step 795. It is then determined whether or not the ear canal sound pressure level is less than effective quiet in a step 732. If the sound pressure level is less than the effective quiet as determined in step 732, then the update epoch is set at the maximum update epoch in a step 730. If the sound pressure level is louder than the effective quite, then in step 716, the update epoch is set to the minimum update epoch.

Returning to FIG. 3, in a non-limiting exemplary embodiment, the update epoch is set at 10 seconds in a step 302 utilizing either a constant predetermined sample time, or either of the methodologies discussed above in connection with FIGS. 6 and 7. In a step 306, the input audio signal is sampled, held, and integrated over the duration of the epoch as determined in step 308. As a result, the update epoch affects the integration period utilized to calculate the sound pressure level dose as a function of the sound pressure level and/or as the weighted ear canal sound pressure level.

In a step 310, an earplug noise reduction rate is stored. The noise reduction rate corresponds to the attenuation effect of earpiece 13, or system 100, on sound as it is received at audio input 11 and output at the output transducer 25 or as it passes from the outer ear to the inner ear, if any exemplary embodiment has no ambient sound microphone 11. In a step 311, a weighting ear canal sound pressure level is determined, partially as a function of the earplug noise reduction rate value.

Figure 4:
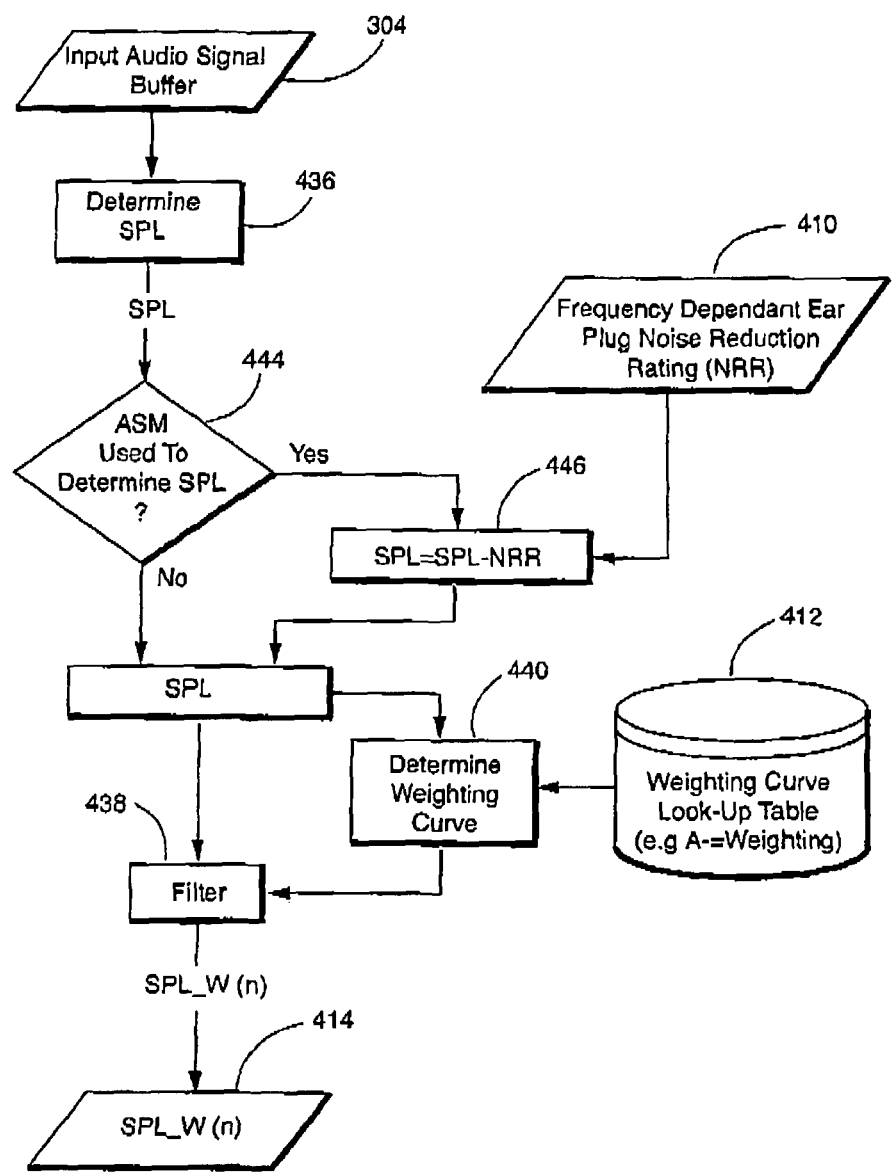
FIG. 4 is a flow chart for determining a weighted ear canal sound pressure level in accordance with another exemplary embodiment of the invention.

Reference is now made to FIG. 4 where a method for determining the weighted ear canal sound pressure level in accordance with at least one exemplary embodiment of the invention is illustrated. Like numerals are utilized to indicate like structure for ease of discussion and understanding. Weighting is done to compensate for the manner in which sound is perceived by the ear as a function of frequency and pressure level. As sounds get louder, the ear hears lower frequencies more efficiently. By weighting, if the level of the sound of the field is low, the methodology and system utilized by at least one exemplary embodiment of the invention reduces the low frequency and high frequency sounds to better replicate the sound as perceived by the ear.

Specifically, a weighting curve lookup table, such as A-weighting, acts as a virtual band-pass filter for frequencies at sound pressure levels. In a step 304, the audio signal is input. In step 410, frequency-dependent earplug noise reduction ratings are stored. These values are frequency-dependent and in most cases, set as manufacturer-specific characteristics.

As discussed above, in a step 306, the input audio signal is shaped, buffered and integrated over the duration of each epoch. The sound pressure level of the shaped signal is then determined in a step 436. It is determined whether or not ambient sound microphone 11 was utilized to determine the sound pressure level in a step 444. If microphone 11 was utilized, then the frequency-dependent earplug noise reduction rating of earpiece 13 must be accounted for to determine the sound level within the ear. Therefore, the noise reduction rating, as stored in step 410, is utilized with the sound pressure level to determine a true sound pressure level (step 446) as follows:

$$SPL_{AcT} = SPL - NRR:$$

where sound pressure $SPL_{AcT}$ is the actual sound pressure level perceived at the ear, SPL is the sound pressure level determined in step 436 and NRR is the noise rate reduction value stored in step 410.

If the ambient sound microphone 11 is not used to determine the sound pressure level then the sound pressure level determined in step 436 is the actual sound pressure level. So that:

$$SPL_{AcT} = SPL$$

It is well within the scope of at least one exemplary embodiment of the invention to utilize the actual sound pressure level as determined so far to determine the affect of the sound pressure level sensed at the ear on the health of the ear. However, in at least one exemplary embodiment, the sound pressure level is weighted to better emulate the sound as heard within the ear. Therefore, in a step 412, a weighting curve lookup table is stored within system 100. In a step 440, the weighting curve is determined as a function of the actual sound pressure level as calculated or determined above in steps 436, 446 utilizing a weighting curve lookup table such as the A-weighting curve. The A-weighting curve is then applied as a filter in step 438 to the actual sound pressure level. A weighted sound pressure level for a sampled time period (SPL_W(n)) is obtained to be utilized in a step 414.

The weighting curve can be determined in step 440 by applying a frequency domain multiplication of the sound pressure level vector and the weighting curve stored in step 412. The weighting curves can be stored as a lookup table on computer memory, or can be calculated algorithmically. Alternatively, the input audio signal can be filtered with a time or frequency domain filter utilizing the weighting curve stored in step 412 and the sound pressure level as calculated. For low-level sound pressure levels, those less than 50 dB, by way of non-limiting example, a weighting curve, which attenuates low and high frequencies can be applied (similar to an A-weighting curve). For higher sound pressure levels, such as more than 80 dB, by way of non-limiting example, the weighting curve can be substantially flat or a C-weighting curve. The resulting weighted ear canal sound pressure level during any respective sampling epoch is returned as the system output SPL_W(n) in step 414.

Returning to FIG. 3, a safe listening time is calculated by comparing the weighted sound pressure level with the effective quiet level (step 312) in step 316. Therefore, a value A corresponding to how far from safe listening the sound pressure level is, is determined by the equation:

$$A = SPL\_W(n) - EfQ$$

where EfQ is equal to the effective quiet time.

By utilizing this simple comparative function, fewer machinations and processes are needed. System 100 takes advantage of the fact that because the effective quiet time is neutral to the ear, sound pressure levels significantly above the effective quiet level are generally damaging and noise levels below the effective quiet are generally restorative.

In a step 318, the remaining safe listening time at the beginning of any current sampling epoch (Time_100%) is calculated. The remaining safe listening time is calculated as follows:

$$Time\_100\% = 24/2^{((SPL\_W(n) - EfQ/3)}.$$

In this embodiment, rather than make use of the Sound Level (L), the period is a function of the loudness and quietness of the weighted sound pressure level. It should be noted that effective quiet is used in the above example, but any level of interest, such as 80 dB, or no sound level, i.e., SPL_W(n)-0, may be used. The weighted sound pressure level and effective quiet can be expressed as a frequency-dependent numerical array or a value scalar.

It is next determined whether or not the difference between the current weighted sound pressure level and the effective quiet is above a tolerable threshold or not, i.e., whether the weighted SPL in the eardrum is considered loud or not. A sound pressure level dose is calculated depending upon whether the sound level is loud or not. The sound pressure level dose is the measurement, which indicates an individual's cumulative exposure to sound pressure levels over time. It accounts for exposure to direct inputs such as MP3 players, phones, radios and other acoustic electronic devices, as well as exposure to environmental or background noise, also referred to as ambient noise. The SPL dose is expressed as a percentage of some maximum time-weighted average for sound pressure level exposure.

Because the sound pressure level dose is cumulative, there is no fixed time-period for ear fatigue or damage. At effective quiet, the sound pressure level exposure time would theoretically be infinite. While the time period for the sound pressure level dose becomes smaller and smaller with longer exposure to loud noise. A tolerable level change threshold corresponding to the amount of noise above or below the effective quiet, which has no great effect on the ear as compared to effective quiet is determined and stored in memory 148 in a step 320. In a step 322, the differential between the weighted sound pressure level and the effective quiet is compared to the level change threshold.

A differential value A, corresponding to the level change, is calculated as follows:

$$A = SPL\_W(n) - EfQ$$

If A is greater than the level change threshold, the noise is considered loud and the sound pressure level is calculated in a step 324 as follows:

$$SPL\ Dose = SPL\ Dose(n-1) + (Update\_Epoch/Time\_100\%)$$

where SPL Dose(n−1) is the SPL Dose calculated during the last epoch; Update_Epoch is the time (in hours) since the last SPL Dose was calculated. As described above, Update_Epoch can be adaptive, e.g., shortened when the sound pressure level is louder; and Time_100%, the time period remaining for safe exposure is determined by the equation:

$$Time\_100\% = 24\ hours/2^{*((L-EfQ)/3)}$$

where L=sound level (in dB) of the combination of Environmental Noise and Audio Playback. It should be noted that sound level (L) can be substituted for SPL_W(n).

It should be noted, as can be seen from the equation, that the time value becomes more important than the sound pressure level as updates are spread apart. However, this is to protect overexposure to harmful sounds because a less accurate sample size must account for the unknown. The wider the periodicity, the less accurate determination of actual exposure. Infrequent updates of the dose assume a relatively constant sound level, ignoring spikes and intervening restorative periods. Accordingly, sound pressure level and epoch periodicity are weighed against each other to protect the ear.

If in step 322 it is determined that the differential is not greater than the level change threshold, including negative values for A (which are restorative values), then in step 326 it is determined whether or not the differential, as determined in step 316, is less than the level change threshold in a step 322. If it is determined that the differential is not less than the level change threshold, then the received noise was the effective quiet level, i.e., the level change threshold equals zero and in a step 330, the current SPL Dose is maintained at the same level. There is no change to the dose level. However, if the differential A is less than the level change threshold then this is a restorative quiet as determined in step 326, so the SPL dose is determined in a Step 328 as follows:

$$SPL\ Dose = SPL\ Dose(n-1) * e^{\wedge}(-Update\_epoch/'r)$$

Where: 't (referred to as "tau" in the following diagrams) is equal to approximately 7 hours. In some embodiments, tau is adaptive for different users. In at least one exemplary embodiment, the level change threshold is set at substantially 0.9-1.0 dB.

In step 332, the recovery time constant tau is determined. It is not a function of exposure, but rather of recovery. It can be a default number or be determined as will be discussed below. As the SPL Dose is calculated by system 100, it is also monitored. Once the SPL Dose reaches a certain level, as it is a cumulative calculation, ear fatigue calculator 130 determines whether or not the SPL Dose corresponds to a fatigued ear, and if so, it outputs warnings as discussed in connection with FIG. 1.

Figure 5:
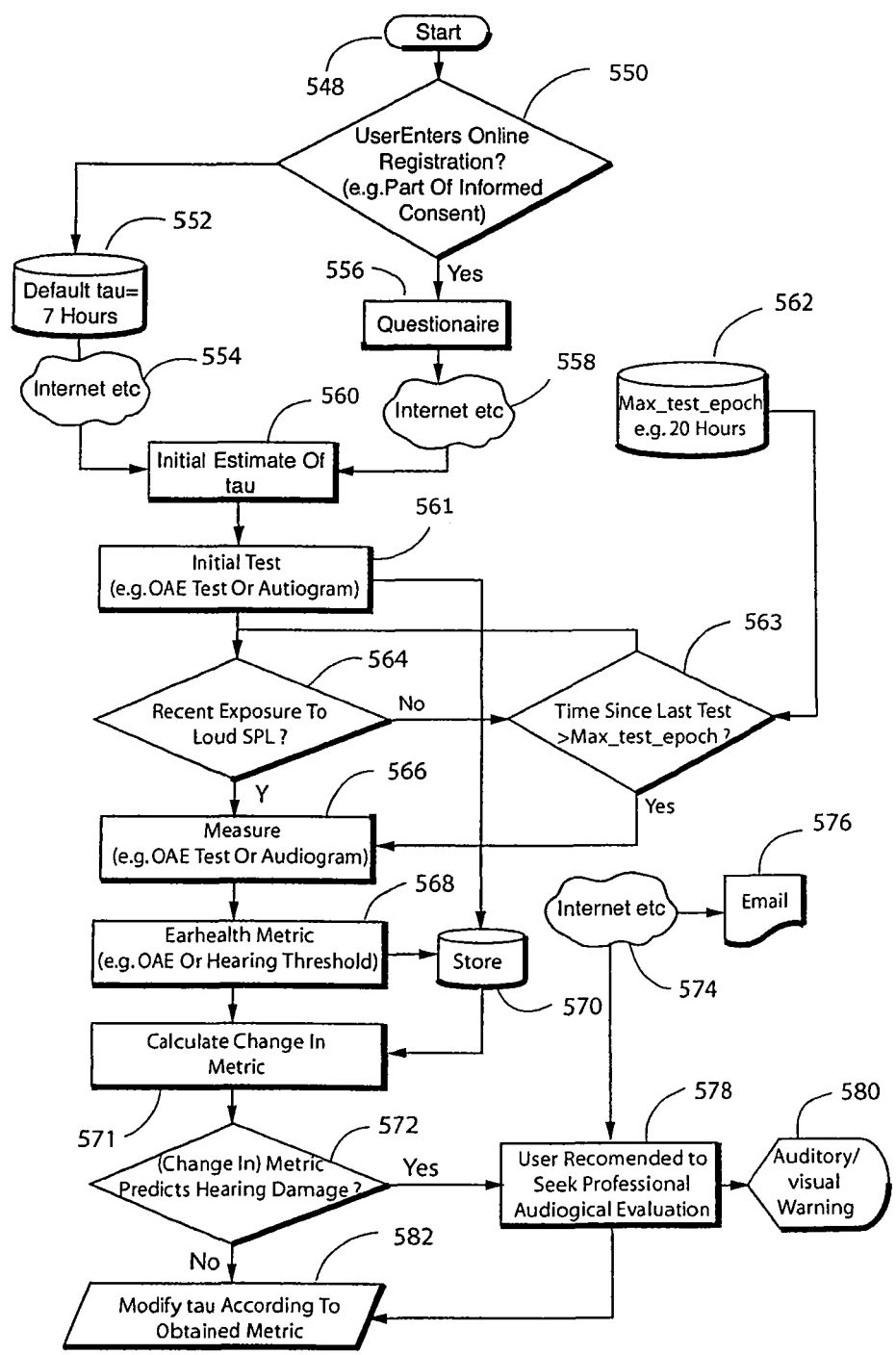
FIG. 5 is a flow chart for determining a personalized recovery time constant in accordance with another exemplary embodiment of the invention.

Reference is now made to FIG. 5 which depicts an optional methodology for not only updating the recovery time constant (tau) for individual users, but to provide additional methods for acting upon detected damaging exposure. The process is started at a step 548. In a step 550, it is determined whether or not the user wishes to make use of a registration process, for example online, for setting a personalized update epoch through communication with a remote registration system. If the user declines the registration, then the default tau is set at 7 hours in a step 552. In a step 554, this default value is transmitted to system 100 via a wired or wireless data communication network.

Alternatively, if the user registers in step 550, a questionnaire is presented in a step 556 in which the user informs system 100 regarding a user sound exposure history, age, work habits and other personal details that could affect the user's personal recovery function time, i.e., the time constant tau. The individual characteristics can be input to a formula or utilized as part of a look up table to determine the tau for the individual user. The estimate of tau determined in step 556 is transmitted to system 100 via a wireless or wired data communication system in a step 558. In step 560, the initial estimate of tau is set from the value determined in step 556.

An initial hearing test is performed in a step 561, which acquires data indicative of the user's hearing sensitivity. The test may be an otoacoustic emission (OAE) test or audiogram administered utilizing the ear canal receiver or speaker 25. However, the test can also be administered over the Internet, telephone or other communication device capable of outputting sounds sent across a distributed network and enabling responsive communication. The data is stored in a computer memory as an initial test value in a step 570 and is used in further processing to detect a change in the user hearing response.

In a step 564, it is determined whether the user has been recently exposed to loud sound pressure levels. This can be done utilizing the sound pressure level dose as stored or permanently calculated by system 100. If it is decided in step 564 that the user's ear canal sound pressure level is low, then in a step 563 it is determined whether the time since the last test is greater than a maximum test epoch. At the outset, the maximum test epoch is a set number determined in a step 562. In this non-limiting example, the maximum test epoch is set at 20 hours.

If it is determined that the time since the last test is greater than the maximum test epoch or, that there has been recent exposure to loud sound pressure level, then another test is administered in a step 566. The resulting test metrics are stored in steps 568, 570. In a step 571, the newly determined test metrics are compared to the initial test metrics to calculate any change in the metrics. In step 572, it is determined whether the change is predictive of hearing damage. If not, then in a step 582, the tau is modified according the obtained metric.

If it is determined that the hearing damage is predicted, then in a step 578 the user is recommended to remove themselves from the noise as discussed above with the operation of fatigue calculator 130 and furthermore, the user can be recommended to seek professional audiological evaluation in a step 578. This could be done by an in situ auditory or visual warning in step 580 by system 100. On the other hand, if system 100 is used in connection with a communications device such as a telephone or a personal digital assistant, an e-mail can be created in steps 574, 576; not only warning the user of potential damage, but notifying a health professional so that a follow up examination can be performed.

It should be noted that a change in the hearing metric (e.g., a hearing sensitivity curve) is measured by system 100. In response to the user's hearing metric, the recovery time constant tau is updated. For example, tau is shortened if the change in the user's hearing metric indicates the user has "sensitive ears", i.e., if, following loud sound exposure, the user's hearing sensitivity takes longer than seven hours to return to the individual's normal. This modified tau can be used to calculate the sound pressure level dose, in particular in restorative phase, to determine better overall sound pressure level exposure.

By providing a monitoring and protective system which, in at least one mode, continuously monitors sound pressure level at the ear until a potentially harmful exposure has occurred, rather than only monitoring for a predetermined time as with Noise Dose monitors which monitor for work shifts, a more accurate predictor of harm to the ear is provided. By utilizing a method, which determines exposure in part as a function of effective quiet exposure as well as loud noise exposure, an enhanced model of potential risk is achieved. By providing a series of warning mechanisms and preventive measures as a function of the determined potentially harmful dosage levels ear damage is more likely to be prevented. By providing the system in an earpiece which substantially occludes the ear and making use of audio inputs at the external and internal ear, a more accurate reading of noise level is provided and more control through a real time warning system is achievable.

It should be known that values for level change threshold, effective quiet time, and epoch were used above as examples. However, it should be noted that any values which when input and utilized in accordance with the methodologies above prevent permanent damage to the ear are within the scope of the invention and the invention should not be so limited to the specific examples above.

Additional Exemplary Embodiments

FIGS. 8-11 illustrate exemplary embodiments of systems according to at least one exemplary embodiment of the present invention.

At least one exemplary embodiment is directed to an earguard monitoring system that includes any communication system able to communicate with an SPL monitoring system or an SPL monitoring information system.

Figure 10:
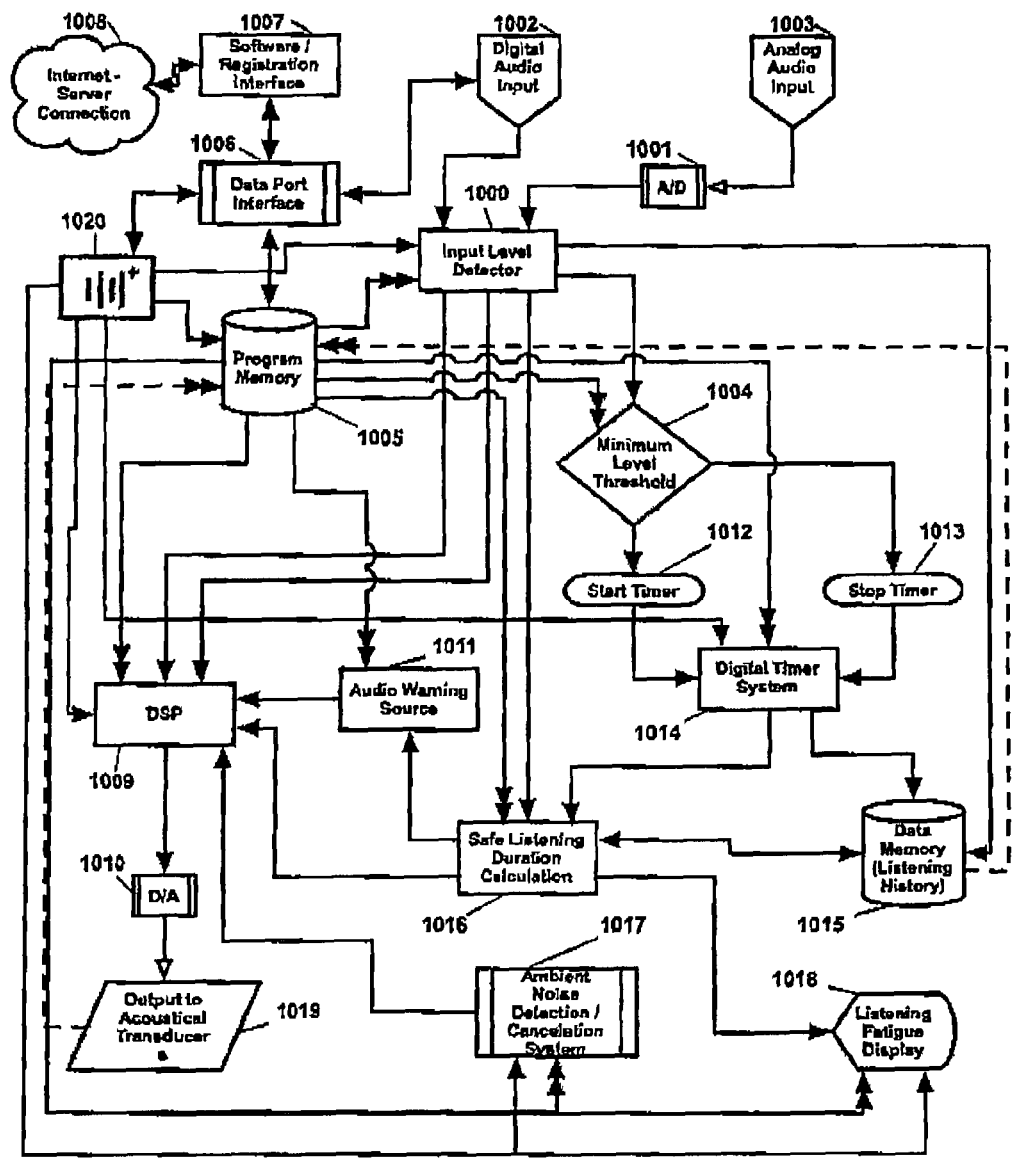
FIG. 10 illustrates in more detail the portion of the system of at least one exemplary embodiment of the present invention that operates on the client side, as a piece of hardware, software, or firmware.

Illustrated in FIG. 10 is an ear input SPL monitoring system for monitoring the SPL exposure over time for a listener, the system can include all or some of the following parts such as: an analog audio input [1003] and an analog to digital converter [1001]; digital audio inputs [1002]; an audio input level monitoring system [1000]; a frequency band monitoring device [1020], where several frequency bands can be monitored independently; a timer system [1014] that can be activated (for example via start timer [1012] and stop timer [1013]) by a minimum audio input threshold [1004]; a non-volatile updatable program memory storage system [1005] (e.g., RAM, memory stick, other electronic data recording medium as known by one of ordinary skill in the relevant arts), containing all necessary Control Data (e.g., threshold values); a non-volatile data memory storage system for storing data (e.g., timer data, audio output dBv data, calculated ear input SPL levels, and other data related to Listening Habits History) to track the user's Listening Habits History [1015]; a data connection system can be included and used for updating Control Data in the program memory [1006] (e.g., via USB, BlueTooth, or other data transfer methods); an ambient noise level detection system [1017]; a method, for example as described above, for estimating the SPL at the listener's ear input based on a default set of acoustical transducer characteristics (e.g., general instrument response function) or, after a registration process such as via software/registration interface [1007], specific acoustical transducer characteristics (e.g., specific instrument response function); a method for calculating the time-weighted average noise exposure for the listener from audio output level data, estimated SPL at ear data, timer data, and Playback Hardware characteristics based default Control Data settings or customized Control Data settings retrieved through a registration processes; a method for calculating a recommended maximum safe listening duration for the listener based on time-weighted average noise exposure calculations and default Control Data settings or customized Control Data settings retrieved through a registration processes [1016] via Internet-server connection [1008].

For example in at least one exemplary embodiment a logic circuit can calculate a safe time duration of listening at the current average acoustic level. In this non-limiting example, the time is broken into increments of time, where the logic circuit measures and stores in a memory storage system an exposure time duration when a signal's SPL exceeds a threshold value for the particular frequency band of the signal and stores the SPL level associated with each increment of time in the exposure time duration. The logic circuit can also measure and store a recovery time duration when the signal's SPL drops below the threshold value for the particular frequency band of the signal and stores the SPL level associated with each increment of time in the recovery time duration. The logic circuit can calculate over an averaging time interval (e.g., user selected, and average time based on exposure SPL level, a stored value for example a value selected by a user during registration with an accessible web based software system) an average SPL dose within the averaging time interval. The logic circuit can then calculate a safe time duration over which a user can receive current sound pressure values. For example if a healthy daily SPL dose is selected to be a value MAX then at the current SPL dosage rate over the averaging time interval, the safe time duration can be determined to be the time it would take from now to reach the MAX value at the average SPL dose.

In at least one exemplary embodiment an indicator element (e.g., a series of LED lights, a warning beep, other visual and acoustical methods) can be used to indicate various scenarios for example; an indicator element, where the indicator element indicates at least one of: when the safe time duration has been exceeded; when a listening duration is within a certain percentage range of the safe time duration; when a listening duration is within various levels, where each level is represented by an indicator color and where each level represents a percentage range of the safe time duration; when a listening duration has exceeded a threshold duration, where the threshold duration is a threshold percentage of the safe time duration; and when the power is low or at least one feature is not working. In at least one exemplary embodiment the indicator element is an audio warning sound source and can include: a speech synthesis system that generates spoken messages indicating the remaining listening duration deemed safe by the ear input SPL monitoring system; a sample playback system that produces a pre-recorded alert signal or spoken message indicating the remaining listening duration deemed safe by the ear input SPL monitoring system, or some related information; and a synthesis system that produces an alert signal relating to the remaining listening duration deemed safe by the ear input SPL monitoring system.

In at least one exemplary embodiment the indicator element is a display system which can include: a display system configured to indicate the level of listener noise exposure and the amount of listening time left before potential Hearing Damage; a color-coded indicator patch; and a LED display. The various indicator levels used can be stored in a memory storage device and can be user selected via a software system which then stores the user selections in the memory storage device.

An earpiece device can include a speaker that directs output audio signals to an ear canal (for example output to transducer [1019]), where when a notification occurs, at least one of the following occurs: an audio warning signal occurs; a visual display is updated with a warning message; and the speaker attenuates the output audio signal.

In at least one exemplary embodiment the Listening Habits History of the user is accounted for in the calculation of a recommended maximum safe listening duration.

At least one exemplary embodiment is directed to a system for automatically attenuating audio input signals that exceed a maximum safe output threshold, which is set by the Control Data [1009]. Threshold settings are based on audiological recommendations, Playback Hardware characteristics, user preferences, or any combination thereof and can be updated through the registration process described in at least one exemplary embodiment.

At least one exemplary embodiment can include an audio warning sound source [1011] that can take the form of one or more of the following: a speech synthesis system that generates spoken messages indicating the remaining listening duration deemed safe by the ear input SPL monitoring system, or some related information; a sample playback system that produces some pre-recorded alert signal or spoken message indicating the remaining listening duration deemed safe by the ear input SPL monitoring system, or some related information; a synthesis system that produces some alert signal relating to the remaining listening duration deemed safe by the ear input SPL monitoring system, or some related information.

Additionally at least one exemplary embodiment can include a display system for indicating the level of listener noise exposure and the amount of listening time left before potential Hearing Damage [1018] that can take the form of one or more of the following: a color-coded indicator patch; a LED display; and/or any appropriate digital display.

At least one further exemplary embodiment can include a digital signal processor for audio signal path attenuation, mixing audio warning signals with audio input, applying filtering to the audio signal path, and additional audio signal path processing indicated by the Control Data [1009] as well as a digital to analog converter [1010].

Exemplary embodiments can further include a method for a user to specify the behavior of the system when excessive levels of SPL exposure are detected. Depending on user specifications, the system either produces: a series of audio warning signals; updates a visual display with a warning message; automatically attenuates audio output using the DSP; and/or any combination of the above the methods describe above.

Figure 11:
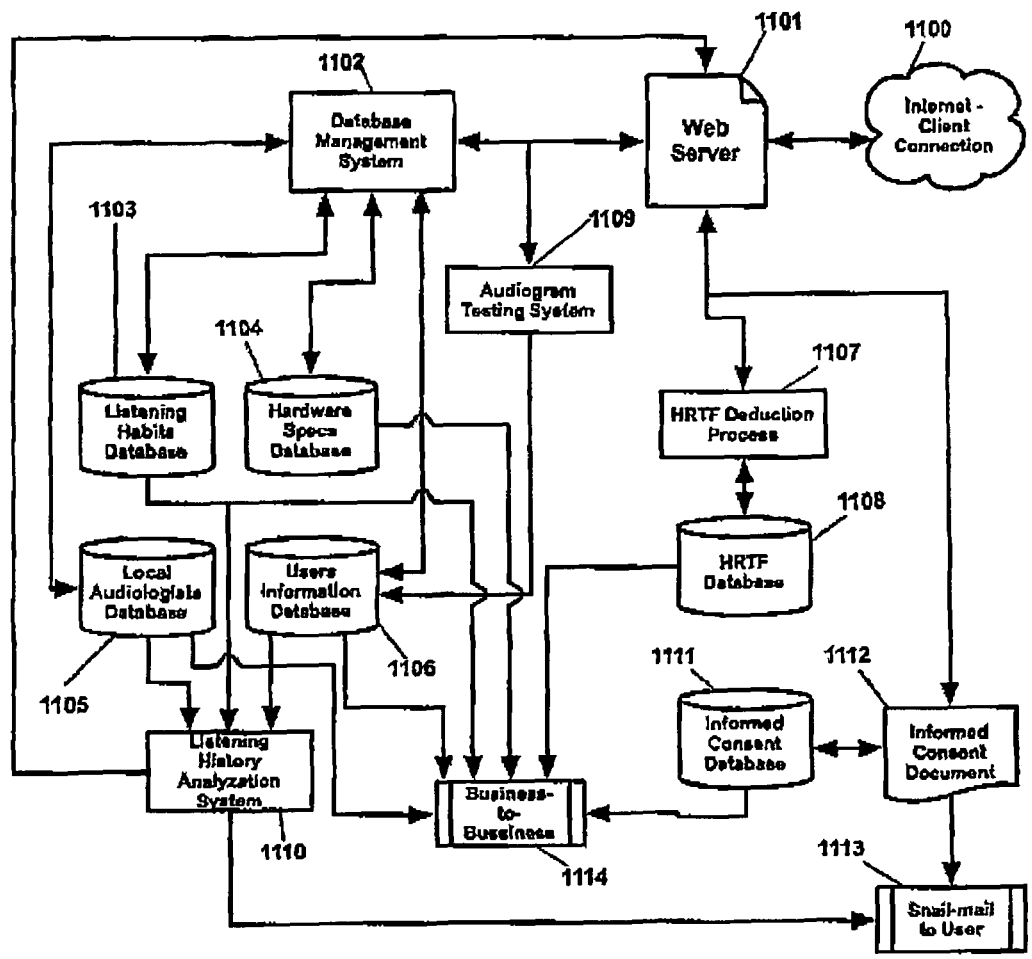
FIG. 11 illustrates in more detail the portion of the system of the present invention that operates on the server side.

Referring to FIG. 11, additionally at least one exemplary embodiment can be used for Headphone listening scenarios, where an earpiece device (e.g., headphone, earbud, or any other device that is configured to deliver acoustic signals to the ear) the system further comprising: a database system [1102] containing information about the earpiece device characteristics, including the SPL output, the positioning of the acoustic transducers with respect to the listener's ear, frequency response compensation data, hardware photographs, price points, and other characteristics [1104].

The system can include an interface for retrieving earpiece device characteristics data (e.g., instrument response functions, frequency response characteristics of the earpiece) from the database (e.g., any database system can be used, or a simple data file ASCII or binary, or a spreadsheet) and inputting that data to the program memory (e.g., RAM) via a data connection [1100] (e.g., via a wire or wireless connection) for example to a web server [1101]. The earpiece device characteristics data (e.g., manufacturer's data, instrument response function, frequency response characteristics, and other earpiece data that can be used to control or modify acoustic signals to the ear) can be stored as a function of an earpiece (e.g., headphone) make and model (e.g., Bose, On-Ear, Quiet Comfort 3™) identification number that is read when the Headphones are connected to the system.

Where the system refers, in at least one exemplary embodiment, to a SPL monitoring information system which comprises: a database stored on an memory storage system, where the database includes data, where the data is at least one of: a list of earpiece devices and associated instrument response functions or other manufacturing information [1104]; a user's audiogram compensation information [1105] (which may be obtained, for example, by an audiogram testing system [1109]); and an earpiece frequency response function; a retriever interface, where a request is obtained through the retriever interface by a sending unit; a logic circuit; and an output control unit, where the request includes a request for a subset of data, where the logic circuit compares the request with the data (e.g., the instrument response function and a user's audiogram) in the database and retrieves the subset of data (e.g., the instrument response function) and sends it to the output control unit (e.g., a logic circuit controlling a Bluetooth wireless emitter) where the output control unit sends the subset of data to the sending unit (e.g., the headphone requesting the data).

The data in the database can contain any data useful for monitoring, modifying or controlling (Control Data) acoustic signals to an ear, but can also include data related to determining Control Data, for example, user information in a database [1106], demographic information, age, and gender, where for example a default user audiogram (a type of Control Data) is entered as data in the database as a default user audiogram based upon age. Data can also include positioning of acoustic transducers in an earpiece according to make and model with respect to the listener's ear, the listening habits history [1103] (e.g., stored SPL doses over time, averaged per day or other amounts of temporal averaging) of a registered user.

The output control unit can send the subset of data to the sending unit via many different methods, for example via snail-mail [1113], e-mail, text message, and a standard communication signal. Once a sending unit receives the subset of data the sending unit can vary its acoustic output characteristics, for example different frequencies can be enhanced (e.g., amplitude increased), based upon the subset of data (e.g., a user's audiogram indication of frequency dependent hearing loss). Note that U.S. Pat. No. 6,840,908 and U.S. Pat. No. 6,379,314 discuss a method for fast acquisition of an individual's Audiogram The sending unit (e.g., earpiece device) can modify or control its acoustic output properties by various methods, for example via the application of an appropriate Headphone frequency response compensation filter or an Audiogram compensation filter (an example of Control Data and a subset of data sent) to the audio signal input using a digital signal processor.

Figure 8:
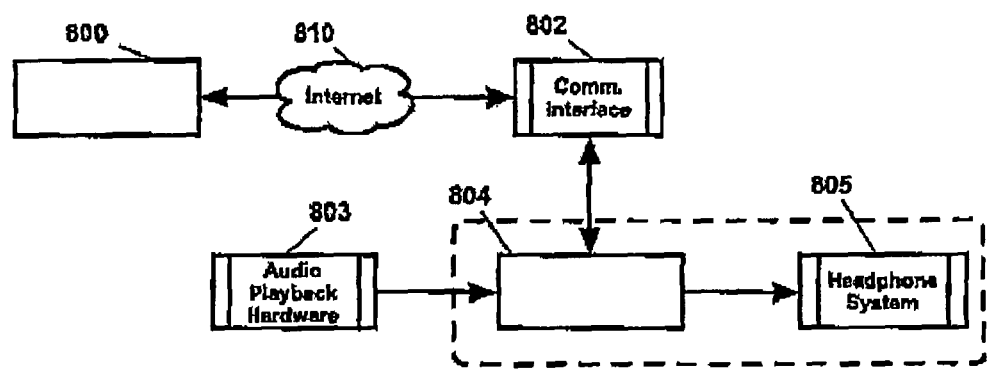
FIG. 8 illustrates the system according to at least one exemplary embodiment of the present invention.

The SPL monitoring information system can be stored on or queried from an earpiece device, a Personal computer system, a Personal Music Player system, an automotive audio system, a home audio system, an avionics audio system, a personal video system, a mobile phone system, a personal digital assistant system, or a eye-glass frames system with acoustical transducers. The SPL monitoring information system (e.g., 800 and 900) can additionally be remotely accessed. For example FIG. 8 illustrates a combined earpiece device (804 and 805), which includes an earguard system 804 (e.g., a system that monitors acoustic output to the ear but also has the capability to communicate to control communications to the SPL monitoring system) and a headphone system 805, which can interact via a communication interface 802, through the internet 810 (e.g., via wired hookup or wirelessly) to a remote SPL monitoring information system 800. Note that FIG. 8 illustrates additional devices (e.g., audio playback hardware 803) that can be connected to the earguard system 804, where characteristics of the additional devices can be obtained via query of the additional devices or data stored in the SPL monitoring information system 800.

Note that using the earguard 804 system in an earpiece device, with the associated SPL monitoring information system (800 or 900), an audible warning signal (an example of an indicator element), some display information, or a combination of both can warn the user when the earpiece device may be insufficient for the measured ambient noise exposure over time.

Figure 9:
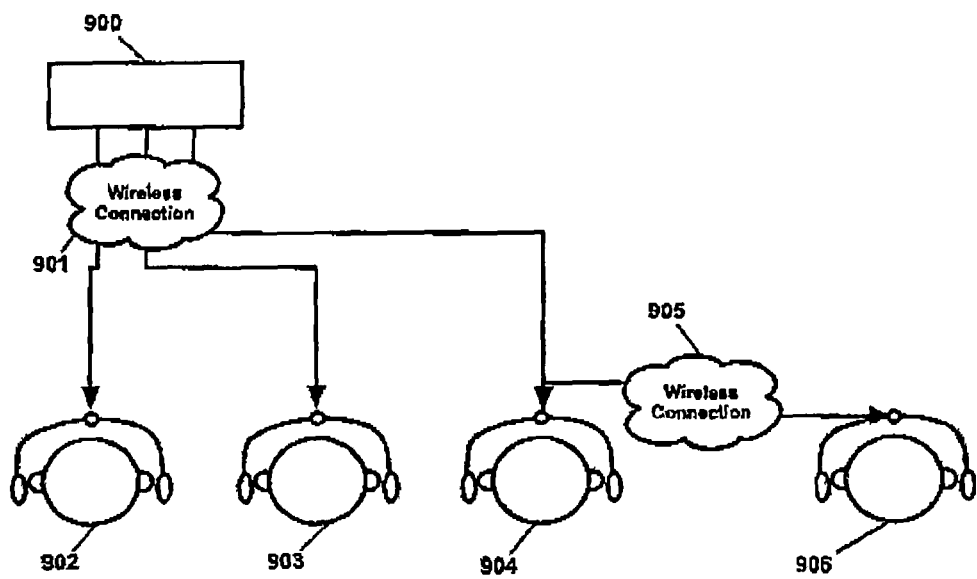
FIG. 9 illustrates how at least one exemplary embodiment of the present invention is applied to share audio signals among multiple users.

FIG. 9 illustrates a possible scenario of use of the earguard system where earpiece devices (e.g, 902, 903, 904, and 906) communicate with each other (i.e., have an earguard system in the earpiece) as illustrated in 905 or directly (e.g., wirelessly 901) with a remote SPL monitoring information system 900. Thus such earpieces could share user data if that feature is enabled (e.g., user set or default). Additionally communication of an earguard system can be via the earpiece via cell phones, Mobile phone networks, or other communication systems. Additionally in at least one configuration an earguard system in an earpiece can query devices within range to seek other earguard systems for information. The request from one earguard can be passed along with that earguard's identifier (e.g., user registration number) and request to another earguard in range which will then pass to another through a chain until a wireless or wired connection with a remote SPL monitoring information system is obtained with the subset of data transmitted via earguard to earguard until the sender unit earguard is identified by it's identifier.

In at least one exemplary embodiment updated Control Data can be transmitted from the Server system to the system based on the registration information provided by the user. Updates to the Control Data can include modification of minimum input threshold parameters, acoustical transducer characteristics, the dBv to dBspl transfer function, the time-weighted average noise exposure calculation parameters, the function relating time-weighted average noise exposure to recommended listening durations, and any filtering parameters that relate to Audiogram compensation, inverse Headphone response, personal preferences, audiological recommendations or other data.

In at least one exemplary embodiment a quick Audiogram acquisition process can be included as part of the registration process via audiogram testing system [1109], and an Audiogram compensation filter can be included as part of the Control Data updates. Audiogram data can be encoded and decoded for transmission using a HIPAA compliant encoding system (for example via an informed consent document [1112] and an encoding process stored in database [1111]) using interface [1114].

At least one exemplary embodiment can also include a registration system to the SPL monitoring information system where a fast head related transfer function (HRTF) deduction process [1107] is included as part of the registration process, and Semi-Personalized HRTF data, stored for example in database [1108] is included as part of the Control Data updates. HRTF and Semi-Personalized HRTF are described in a "Method of Modifying Audio Content", application Ser. No. 11/751,259 filed 21 May 2007, the contents of which are hereby incorporated by reference in its entirety. Additionally the user can specify the devices he/she plans to use from a stored list, which will be added to her registered account.

In at least one exemplary embodiment the user can have his/her earpiece on, which is in communication with a remote SPL monitoring information system, where the user is modifying personal settings and listening to the effect on his/her earpiece in near real time, facilitating his/her choice of the best listening environment. A feedback system [1110], allowing the user to select the best listening experience from a number of candidate listening experiences, based on the spatial quality perceived in the HRTF-processed auditory test signal.

In at least one exemplary embodiment a SPL monitoring information system can include Listening Habit information [1103], for example which was sent via a Server every time the data port is connected to a communications network capable of connecting with the Server. Additionally the Listening Habits information can be entered during the registration process. The SPL monitoring information system can be set to send regular reports of statistical trends in Listening Habits Histories, Audiograms, and registration information across many users and many demographics, and can provide information to a given user relating their personal Listening Habits History, Audiogram results, and registration information to statistical trends and additionally can be set to send a notification to a registered user indicating when the said user should re-take an Audiogram test via audiogram testing system [1109].

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments.

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A sound pressure level (SPL) monitoring information system comprising:
  a database configured to store data including at least one of:
    a list of earpiece devices and associated instrument response functions;
    audiogram compensation information; or
    an earpiece frequency response function; and
  an SPL monitoring system comprising a microphone, wherein the SPL monitoring system is configured to receive a plurality of signals,
    wherein each signal of the plurality of signals represents a respective SPL of sound pressure values over a time duration for a predetermined frequency band,
    wherein the SPL monitoring system is configured to determine: (a) an exposure time duration when at least one of the signals of the plurality of signals exceeds a SPL threshold value for the predetermined frequency band and (b) a recovery time duration when at least one of the signals of the plurality of signals is less than the SPL threshold value for the predetermined frequency band;
    wherein the SPL monitoring system is configured to receive a request from a sending unit for a subset of data, and is configured to retrieve the subset of data from the database and send the subset of data to the sending unit; and
    wherein an earpiece of the list of earpiece devices is configured to modify an acoustic output in accordance with the subset of data received from the SPL monitoring system.

2. The SPL monitoring information system according to claim 1, wherein the subset of data further includes at least age information and gender information, and wherein a default audiogram in the database is based upon age and gender.

3. The SPL monitoring information system according to claim 1, wherein the subset of data further includes a SPL output of a particular earpiece device make and model, a positioning of acoustic transducers in the particular earpiece device with respect to an ear, or a combination thereof.

4. The SPL monitoring information system according to claim 1, wherein the subset of data further includes a listening habits history of a registered user including ear input SPL data, listening duration data, time between listening sessions, or a combination thereof.

5. The SPL monitoring information system according to claim 1, wherein the SPL monitoring system sends the subset of data to the sending unit by an email, a text message, a standard communication signal, or a combination thereof.

6. The SPL monitoring information system according to claim 1, wherein the SPL monitoring system is configured to further determine: (c) an average SPL dose over an averaging time interval within the time duration, (d) a safe time duration over which current sound pressure values can be provided to a user, or a combination thereof.

7. The SPL monitoring information system according to claim 1, wherein the SPL threshold value represents a neutral ear damage level of a user of a particular earpiece device, such that an ear recovery function occurs below the SPL threshold value.

8. A method of modifying audio output of an earpiece device comprising:
sending the request for the subset of data from the earpiece device selected from the list of earpiece devices to the SPL monitoring system according to claim 1; and
receiving the subset of data from the SPL monitoring system.

9. The method according to claim 8, wherein the subset of data is an instrument response function of the earpiece device, wherein the instrument response function is included within the associated instrument response functions.

10. The method according to claim 8, wherein the subset of data is the audiogram compensation information associated with a user of the earpiece device.

11. The method according to claim 10, wherein the subset of data is the earpiece frequency response function.

12. A sound pressure level (SPL) monitoring system for monitoring sound exposure to a user comprising:
a microphone configured to receive sound pressure values over a time duration and output a plurality of electronic signals, wherein each electronic signal of the plurality of electronic signals represents a respective sound pressure level (SPL) of the received sound pressure values over the time duration for a predetermined frequency band;
a logic circuit configured to receive the plurality of electronic signals and to determine: (a) an exposure time duration when at least one of the electronic signals of the plurality of electronic signals exceeds a SPL threshold value for the predetermined frequency band, and (b) a recovery time duration when at least one of the electronic signals of the plurality of electronic signals is less than the SPL threshold value for the predetermined frequency band, and one or more of (c) an average SPL dose over an averaging time interval within the time duration for the predetermined frequency band, and (d) a safe time duration over which current sound pressure values can be provided to a user for the predetermined frequency band;
an indicator element configured to indicate an event in response to the plurality of electronic signals; and
an earpiece configured to modify an acoustic output in accordance with a subset of the SPL of the received sound pressure values.

13. The SPL monitoring system according to claim 12, wherein the event includes: when the safe time duration has been exceeded, when a listening duration is within a certain percentage range of the safe time duration, when the listening duration is within one or more predetermined levels, when a power of the SPL monitoring system is low, when at least one feature of the SPL monitoring system is not working, or a combination thereof.

14. The SPL monitoring system according to claim 12, wherein the event includes when a listening duration is within one or more predetermined levels, and wherein each predetermined level is represented by an indicator color, and each level represents a percentage range of the safe time duration.

15. The SPL monitoring system according to claim 12, wherein the indicator element includes an audio warning sound source.

16. The SPL monitoring system according to claim 15, wherein the audio warning sound source generates a spoken message indicating a remaining listening duration deemed safe by the SPL monitoring system, an alert signal indicating the remaining listening duration, or a combination thereof.

17. The SPL monitoring system according to claim 12, wherein the indicator element includes a color-coded indicator.

18. The SPL monitoring system according to claim 12, further comprising a speaker configured to direct an audio signal to an ear canal.

19. The SPL monitoring system according to claim 18, wherein in response to indicating the event, the following occurs: an audio warning signal is output by the SPL monitoring system, a visual display coupled to the SPL monitoring system indicates a warning message, the speaker attenuates the audio signal, or a combination thereof.

20. The SPL monitoring system according to claim 12, wherein the SPL threshold value represents a neutral ear damage level of the user, such that an ear recovery function occurs below the SPL threshold value.

* * * * *